United States Patent [19]
Henrio

[11] Patent Number: 6,083,448
[45] Date of Patent: Jul. 4, 2000

[54] METHOD OF BLADDER MOULDING THIN ARTICLES MADE OF A COMPOSITE MATERIAL USING A CONFORMING DEVICE

[75] Inventor: Philippe Henrio, Lisses, France

[73] Assignee: Societe Nationale d'Etude et de Construction de Moteurs d'Aviation "SNECMA", Paris, France

[21] Appl. No.: 09/027,222

[22] Filed: Feb. 20, 1998

[30] Foreign Application Priority Data

Feb. 20, 1997 [FR] France ................................. 97 01996

[51] Int. Cl.[7] ................................................. B29C 43/10
[52] U.S. Cl. ........................... 264/511; 264/258; 264/313
[58] Field of Search .................................. 264/511, 258, 264/313, 314; 156/245, 285, 307.1, 323, 382, 583.3

[56] References Cited

U.S. PATENT DOCUMENTS

| | | |
|---|---|---|
| 4,824,631 | 4/1989 | Yeager . |
| 5,597,435 | 1/1997 | Desautels et al. ...................... 156/245 |

FOREIGN PATENT DOCUMENTS

| | | |
|---|---|---|
| 2 667 013 | 3/1992 | France . |
| 2 066 144 | 7/1981 | United Kingdom . |
| 2 184 053 | 6/1987 | United Kingdom . |
| WO 91/08885 | 6/1991 | WIPO . |

OTHER PUBLICATIONS

Patent Abstracts of Japan, vol. 009, No. 300 (M–433), Nov. 27, 1985 & JP 60 139433 A, Jul. 24, 1985.
G. Musch, et al., "Tooling with Reinforced Elastomeric Materials", Composites Manufacturing, vol. 3, No. 2, Jan. 1, 1992, pp. 101–111.

*Primary Examiner*—Michael W. Ball
*Assistant Examiner*—Michael A Tolin
*Attorney, Agent, or Firm*—Oblon, Spivak, McClelland, Maier & Neustadt, P.C.

[57] ABSTRACT

The invention proposes a process for bladder moulding thin articles made of a composite material consisting of fibre and polymerised resin, the articles comprising corners having a rounded vertex and produced by a shaper. Such a process is distinguished in that the surface experiencing the air pressure is convex and the normals to the surface converge on the rounded shaping vertex of the shaper.

3 Claims, 1 Drawing Sheet

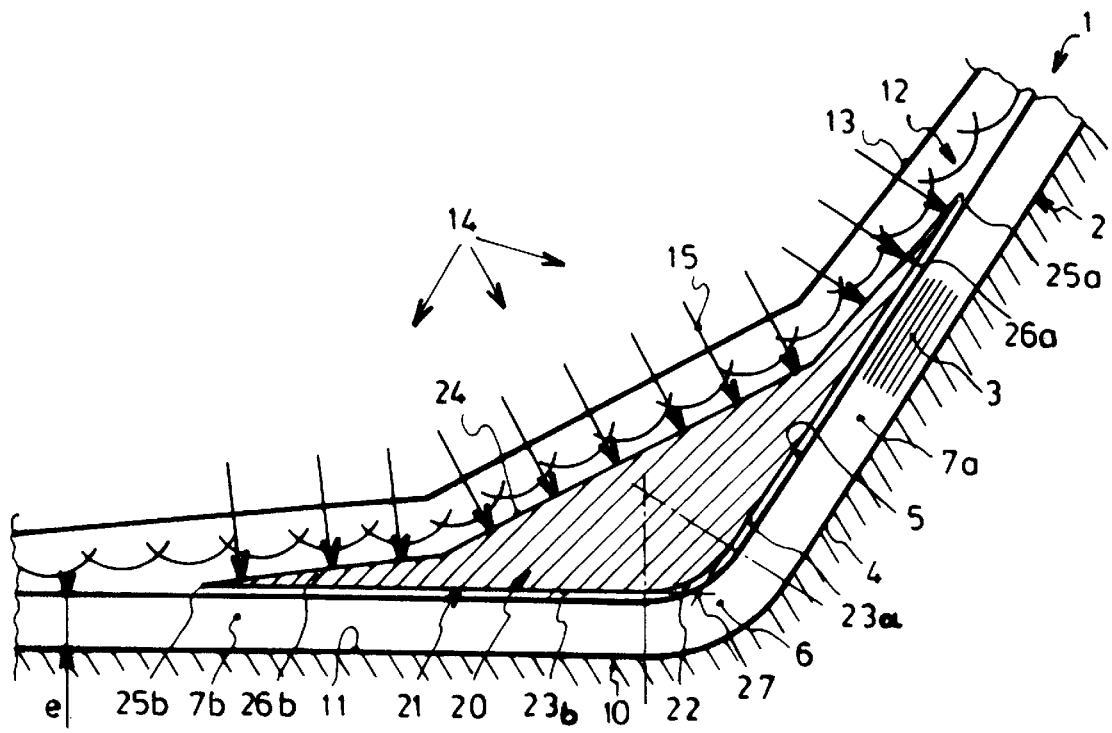
FIG: 1
PRIOR ART
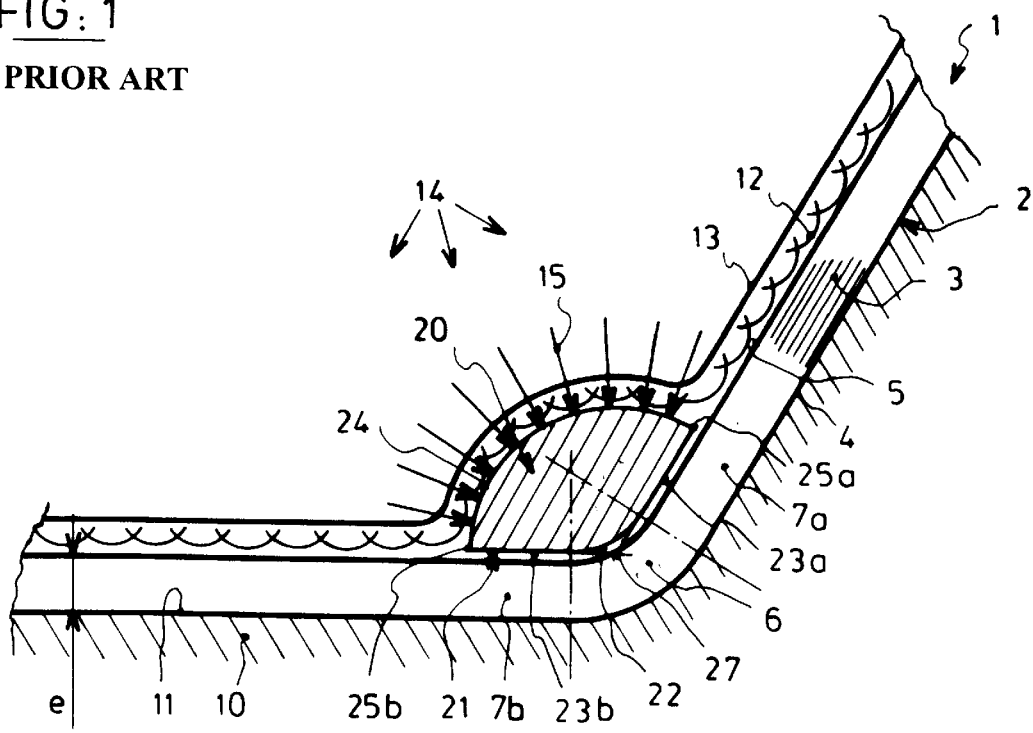
FIG: 2

METHOD OF BLADDER MOULDING THIN ARTICLES MADE OF A COMPOSITE MATERIAL USING A CONFORMING DEVICE

BACKGROUND OF THE INVENTION

The invention relates to processes for bag moulding thin articles made of a composite material consisting of layers of reinforcing fibres embedded in a matrix of resin to be polymerised, and more particularly to a moulding process using a shaper to fashion the corners of such articles.

Bag or bladder moulding is familiar to the skilled addressee and is used to mould thin-walled articles made of a composite polymerisable fibre resin material. This process uses an open mould having a moulding surface corresponding to the shape of the required article. Layers of fibres impregnated with polymerisable resin are placed on the moulding surface, the fibre layers are covered by fabrics which may or may not be contiguous and by a bladder or bag which is hermetically sealed off from the mould, an isostatic air pressure is applied to the bladder and the whole is treated by a polymerisation cycle which is usually performed hot.

The article may comprise projecting corners having a rounded vertex. To form these roundings correctly a shaper is so placed between the article and the bladder as to be in contact with the concave surface of the rounding. A shaper is a solid member which usually takes the form of a rod and which comprises a shaping surface engaged with the concave surface of the article in the hollow of and adjacent to the required rounding, the shaping surface having a shape matching the concave surface of the article—i.e., the shaping surface is convex and has a rounded vertex prolonged on either side by flanks, the shaper also comprising a surface which experiences the air pressure and which is remote from the shaping surface. The air pressure causes the shaper to urge the resin-impregnated fibre layers against the moulding surface and thus facilitates the proper shaping of the rounding in the corner of the article.

The disadvantage of the process is that the shaper edges mark the article and produce thereon abrupt changes in thickness which reduce the strength of the article. This is a particularly serious disadvantage in aeronautics since the articles are severely stressed and often have low-tolerance profiles.

This problem is solved by the use of shapers which are made of flexible elastomer and which have tapering bevel edges. The thickness inequalities are greatly reduced but not eliminated. Also, since high-strength resins require a high polymerisation temperature, shapers of this kind are soon damaged by the heat and require frequent renewal. Finally, the shapers are difficult to position in the corner of the article because of the large contact areas involved and because of pre-compression swelling of the fibres or layers of fabric.

BRIEF SUMMARY OF THE INVENTION

To solve this problem the invention proposes to give the pressure-experiencing shaper surface a convex profile whose normals pass through the rounded shaping vertex of the shaper. The effect of such a profile is to make the pressure forces converge on the shaping vertex of the shaper. The pressure forces no longer produce near the shaper edges resultant forces which tend to tilt the shaper. The shaper edges therefore no longer tend to penetrate into the composite material in the plastic state, so that abrupt ruptures in the thickness of the article are obviated. The convex profile of the pressure-experiencing shaper surface also has the effect of preventing the bladder from pulling on the shaper, so that there is less tendency for the shaper to tilt and penetrate further.

Another advantage of the invention is that the shaper takes up its position automatically in the corner of the article.

Clearly, such a result is achieved by the special geometry of the shaper. Advantageously, the shaper is made of a material which withstands the resin polymerisation temperature, for example, a rigid metal alloy such as a steel or an aluminium alloy. The shaper ceases to be damaged and can therefore be reused indefinitely.

In one particular embodiment of the invention the shaper surface experiencing the isostatic pressure has a circle arc profile centred substantially on the vertex of the angle between the shaping flanks of the shaper, such a profile being of a simplified kind.

BRIEF DESCIPTION OF THE DRAWINGS

The invention will be more clearly understood, and the advantages it provides become more clearly apparent, from a brief review of the prior art moulding process, from a detailed example of the use of the process according to the invention and from the accompanying drawings.

FIG. 1 shows the use of a shaper in the prior art process.

FIG. 2 shows the use of a shaper in the process according to the invention

DETAILED DESCRIPTION OF THE INVENTION

Referring first to FIG. 1, the article 1 to be produced comprises a thin wall 2 consisting of fibre layers 3 embedded in a resin which has no reference number and which is conventionally hot polymerisable. The article 1 forms a corner such that one side 4 of the wall 2 is a convex surface whereas the side 5 remote from the side 4 is a concave surface The thin wall 2 comprises a rounded vertex 6 which is substantially in the shape of a circle arc and which is prolonged on either side by flanks 7a, 7b which are substantially plane at least near the rounding 6, the flanks 7a, 7b therefore meeting by way of the rounded vertex 6.

The article 1 is produced by means of a mould 10 whose moulding surface 11 has a shape matching the shape of the convex surface 4 of the required article 1. To this end the resin-impregnated fibre layers 3 are engaged with the moulding surface 11, the layers 3 are covered by various contiguous fabrics 12 familiar to the skilled addressee and by a bladder or bag 13 which is hermetically sealed off from the mould 10 and an isostatic air pressure 14 is applied to the bladder 13 and subjects the same to normal-acting pressure forces 15—i e., pressure forces which act perpendicularly to the bladder 13. The effect of the air pressure 14 is to engage the layers 3 with the moulding surface 11 and to densify the layers 3, the densification causing a 20 to 30% reduction in the thickness e of the article 1. The air pressure 14 is maintained and the resin is polymerised, usually hot polymerised.

To shape the rounding 6 of the article 1 correctly a shaper 20 must be interposed between the article 1 and the bladder 13 below the fabrics 12. The shaper 20 has a shaping surface 21 shaped to match the concave surface 5 in the corner of the article 1, and so the surface 21 comprises a shaping rounding 22 prolonged on either side by shaping flanks 23a and 23b. The shaper also comprises a surface 24 which experiences the air pressure 14 and which is remote from the shaping surface 21. The surfaces 21 24 meet on the shaper edges 25a and 25b. The air pressure 14 therefore forces the shaper 20 like a wedge into the layers 3 in the rounding 6 of the article 1 and of the flanks 7a and 7b prolonging the rounding 6, so that the required shape can be given to the rounding 6 and to the adjacent flanks 7a, 7b.

However, because of the pressure forces 15 acting on the shaper edges 25a and 25b the shaper 1 tends to open and/or tilt and so its edges 25a or 25b tend to penetrate into the article 1 and form marks thereon To obviate this disadvantage the pressure-experiencing surface 24 is given a concave shape and the shaper edges 25a, 25b are prolonged by very finely tapered extensions 26a, 26b, the shaper 1 itself being made of a flexible elastomer This feature reduces marking of the article but does not obviate them. Also, because of the material used such a shaper is soon destroyed by the temperature rise needed to polymerise the article 1.

Referring now to FIG. 2, the previous description applies throughout except for the following elements which are part of the invention. In this example of the use of the process according to the invention a shaper 20 is used whose pressure-experiencing surface 24 has a convex circle arc profile centred on the vertex 27 of the corner formed by the shaping flanks 23a and 23b. The pressure forces 15 therefore converge on the vertex 27 and do not cause the shaper 1 to tilt. This shaper 1 is made of aluminium and can be re-used indefinitely.

I claim:

1. A process for bladder moulding with a shaper a thin article including a composite material, the article forming a corner including a thin wall having two flanks which meet one another by way of a rounded vertex, the thin wall having a convex surface and a concave surface, the composite material including fibre layers embedded in a resin, the process using a mould corresponding to the shape of the convex surface and a shaper, the shaper comprising a shaping surface corresponding to the shape of the concave surface in the corner of the article, the shaping surface comprising a rounded shaping vertex prolonged on either side by two shaping flanks forming a corner vertex, and a surface experiencing an isostatic air pressure by way of a bladder, the isostatic air pressure applying to the pressure-experiencing surface pressure forces, wherein the pressure-experiencing surface of the shaper is convex and the normals to the surface pass through the rounded shaping vertex of the shaper in order to make the pressure forces converge on the rounded shaping vertex.

2. A process according to claim 1, wherein the shaper includes a rigid metal alloy.

3. A process according to claim 1 or 2, wherein the pressure-experiencing surface has a circle arc profile centred on the vertex of the angle between the two shaping flanks.

* * * * *